July 6, 1965 W. W. EGEE ETAL 3,193,156
DISPENSING MECHANISM
Filed Aug. 27, 1963 2 Sheets-Sheet 1

INVENTORS:
WALTER WARREN EGEE
ALEC SMITH
BY Howson & Howson
ATTYS.

July 6, 1965  W. W. EGEE ETAL  3,193,156
DISPENSING MECHANISM
Filed Aug. 27, 1963  2 Sheets-Sheet 2
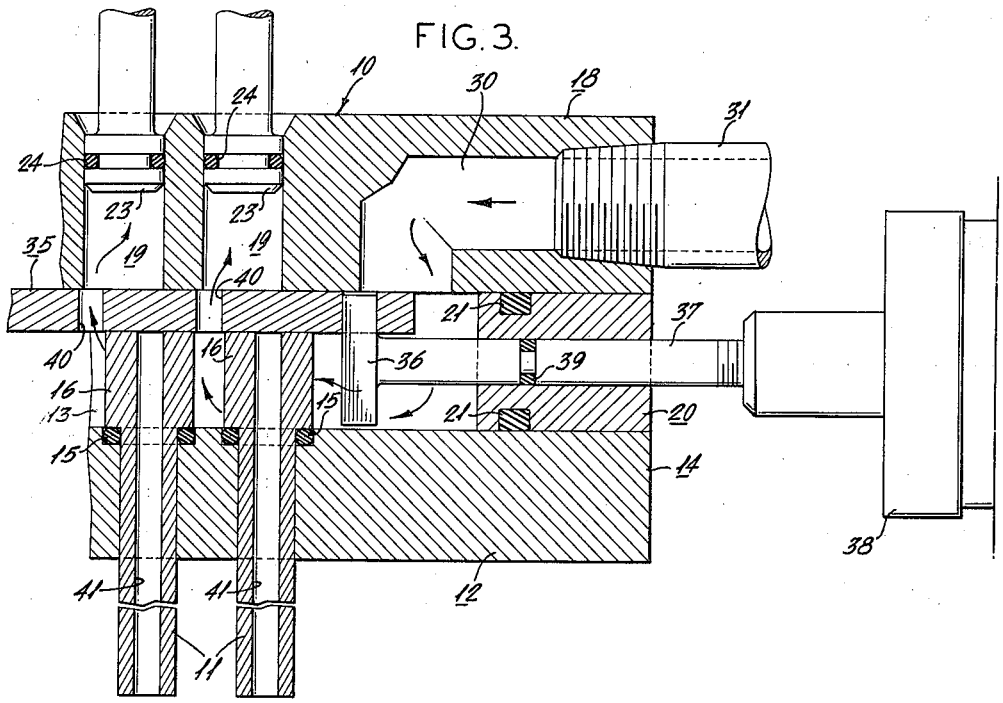
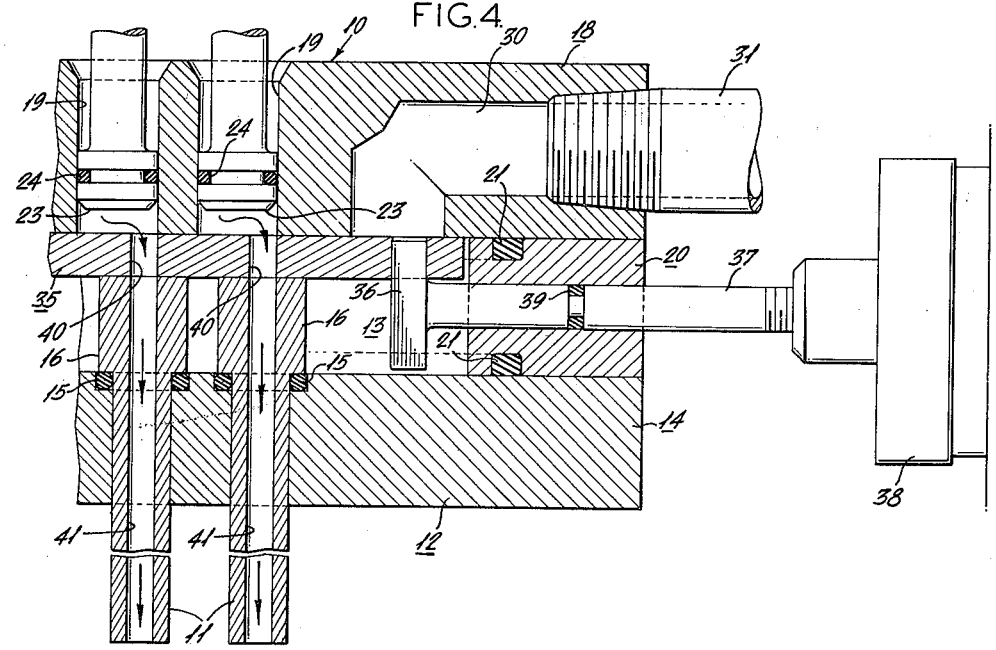
INVENTORS:
WALTER WARREN EGEE
ALEC SMITH
BY Howson & Howson
ATTYS.

3,193,156
DISPENSING MECHANISM
Walter W. Egee, Wallingford, Pa., and Alec B. Smith, Palmyra, N.J., assignors to Campbell Soup Company, Camden, N.J., a corporation of New Jersey
Filed Aug. 27, 1963, Ser. No. 304,785
9 Claims. (Cl. 222—255)

This invention relates to dispensing mechanism for feeding controlled uniform amounts of material. The dispensing mechanism of the present invention is particularly suitable for feeding controlled uniform amounts of a light, fluffy material, such as mousse or other topping material, upon cakes, such as those known as parfait cakes, and has for an object the provision of improvements in this art.

One of the particular objects of the invention is to provide dispensing mechanism which will readily handle all types of material and particularly light, fluffy material without unduly compressing it and without subjecting the material to vacuum.

Another object is to provide dispensing mechanism which will have a positive action to accurately supply a plurality of predetermined amounts of material.

Another object is to provide dispensing mechanism which acts in regular controlled periods of time so as to cooperate in accurate timed relationship with the movements of the articles to be served.

Another object is to provide a dispensing device which always maintains an ample supply of material in a location which is closely adjacent to the final point of serving.

Another object is to provide dispensing mechanism which is simple and inexpensive and easily taken apart and cleaned.

The above and other objects of the invention, as well as various features of novelty and advantages, will be apparent from the following description of an exemplary embodiment, reference being made to the accompanying drawings, wherein:

FIG. 3 is a partial enlarged vertical section with the dispensing valve plate at one end of its stroke for filling the metering cylinders; and FIG. 4 is a view like FIG. 3 but showing the dispensing valve plate at the other end of its stroke.

Figure 2:
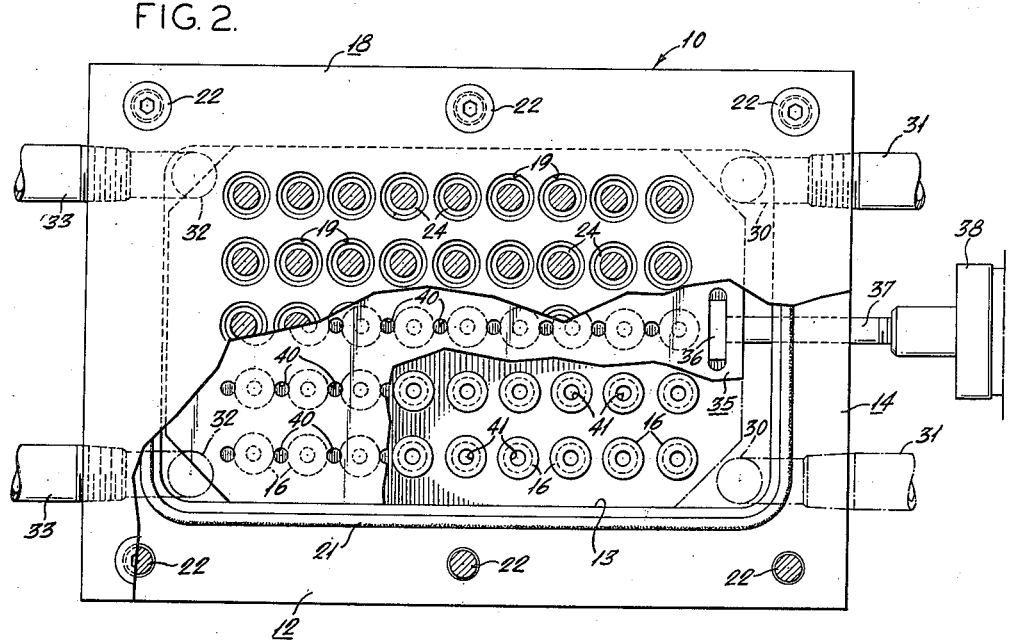
FIG. 2 is a horizontal section taken at different levels of the mechanism shown in FIG. 1.
Figure 1:
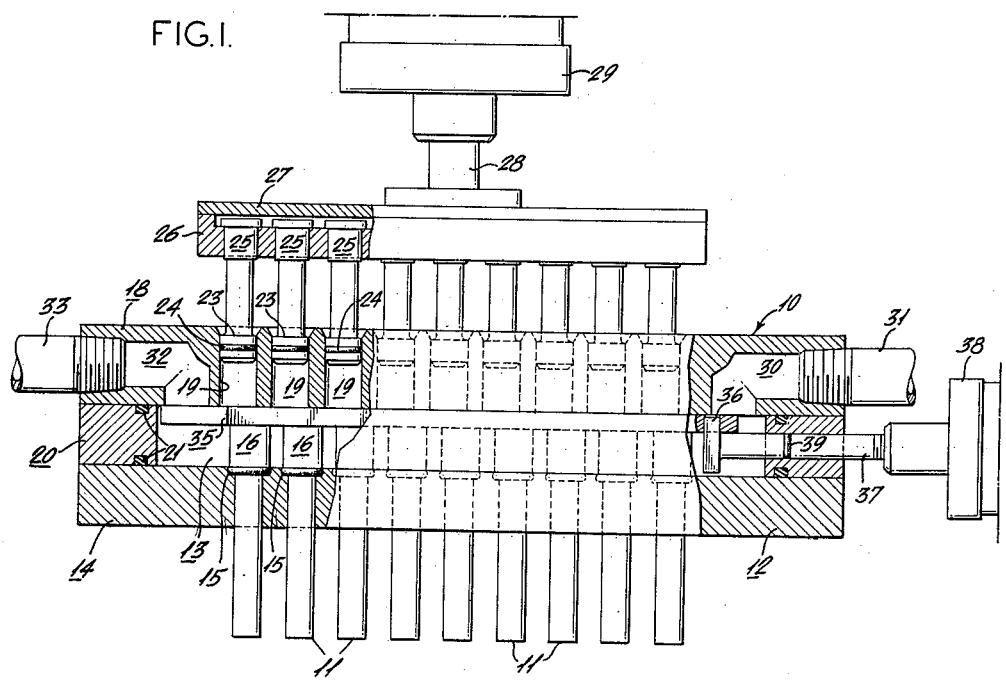
FIG. 1 is an elevational view, partly in vertical section, of dispensing mechanism embodying the invention.

The mechanism may be referred to generally as a filling head 10 having a plurality of filling nozzle 11 located in proper positions to stand above a cake or a plurality of cakes (not shown) which may be presented in timed relationship with the dispensing action of the filling head to deposit a charge of material upon the top of each cake. Although cake topping is referred to by way of illustration, it will be obvious that the charges of material could be dispensed for any other purpose desired.

The nozzles 11 are secured in a bottom plate 12 of a product chamber or reservoir 13 of a casing 14 as by being pushed down through holes in the plate to resiliently seat against sealing O-rings 15 in enlargements of the holes and leave an enlarged upper end portion or head 16 of each nozzle projecting upwardly through the product chamber 13 with the upper end surfaces of the enlarged end portions 16 disposed in a common horizontal plane.

At a spaced distance above the bottom plate 12 there is provided a cylinder plate 18 having a plurality of metering cylinders 19 provided therein at locations which correspond to but are slightly offset relative to the nozzle heads 16. A spacer plate 20 provided with sealing rings 21 is disposed between the plates 18 and 12, the parts all being clamped together by bolts 22.

In each cylinder bore 19 there operates a metering piston 23 having a sealing ring 24, the pistons having rods with heads 25 secured in a plunger plate 26, held if desired by a screw-secured cap plate 27, operated by the plunger 28 of a reciprocatory power device 29. Means are provided for varying the length of stroke of the pistons but such means will be readily understood without illustration.

The casing 14, specifically the cylinder plate 18, is provided with supply channels 30 served by supply pipes 31 and outflow channels 32 provided with outflow pipes 33 which preferably return excess material to the supply source. Both channels 30 and 32 open to the product chamber 13 and the outflow channels assure that the chamber will be completely filled without the entrapment of air.

Within the product chamber between the tops of the nozzle heads 16 and the bottom of the cylinder plate 18 there operates a shuttle valve plate 35 having a slip-on connection 36 with the end of a piston rod 37 of a reciprocatory power device 38 which is timed in action with the action of the dispensing piston device 29. The piston rod 37 is provided with a sealing ring 39 to prevent leakage of material from the product chamber. It will be seen that the O-rings 15 on which the heads 16 of the nozzles seat resiliently urge the upper surface of the head of the nozzles into sealing engagement with the underside of the valve plate 35 and in turn urge the valve plate 35 upwardly against the cylinder plate 18.

The shuttle valve plate 35 is provided with through port holes 40 which, as shown in FIG. 3 with the valve plate at one end of its stroke, place the product chamber or reservoir 13 in communication with the cylinders 19 and which as shown in FIG. 4 with the valve plate at the other end of its stroke, place the cylinders 19 in communication with the bores 41 in the nozzles 11.

In operation, the supply pipes 31 continuously force material into the chamber 13 under a small pressure of a few pounds per square inch and the outflow pipes 33 allow excess material to flow out so that the chamber 13 is continuously maintained full of material under pressure. When the shuttle valve plate moves to one end to place the port holes 40 in position to connect the chamber 13 with the cylinder chambers 19 the pistons 23 will at the same time move upwardly to permit the material to fill the cylinder chambers. When the valve plate moves to the other end of its stroke to place the port holes 40 in position to connect the cylinder chambers with the bores 41 of the nozzles the pistons 23 will at the same time move downwardly to force the material down through the nozzles and upon the tops of the cakes or upon such articles or receptacles as may be positioned therebelow.

This action continues at regular intervals, with a new cake or group of cakes being presented below the nozzles for each cycle of operation.

The machine dispenses a multiplicity of small equal portions of material in a definite pattern and in carefully controlled amounts. Since the products to be handled must not be altered in their physical characteristics, the mechanism is such that the product flow is impeded as little as practicable and the mechanical action on the product is kept to a minimum. Also, with the product supply chamber completely surrounding the nozzles, there is ample space for the flow of the product with a minimum of restriction to flow. In addition to fulfilling the above requirements, the machine is sanitary, easy to clean and made of materials which can move freely without scoring since it is not permissible to use lubricating oils which would contaminate the product.

While one embodiment of the invention has been disclosed for purposes of illustration, it is to be understood that there may be various embodiments and modifications within the general scope of the invention.

We claim:

1. Dispensing mechanism comprising in combination, a dispensing head having a product reservoir chamber, a dispensing nozzle extending from one side of said reservoir chamber through said chamber and having a dispensing passage therethrough, a cylinder extending from said one side of said chamber in the opposite direction from said nozzle and having its axis offset laterally from the axis of said nozzle dispensing passage, a piston operating in said cylinder for drawing in material from said reservoir chamber and discharging it through said nozzle passage, means for continuously forcing material into said reservoir chamber, and a shiftable valve in said reservoir chamber having a port hole therethrough arranged in one position to connect said reservoir chamber with the cylinder and in another position to connect the nozzle channel with the cylinder.

2. Dispensing mechanism comprising in combination, a dispensing head having a product reservoir chamber, a dispensing nozzle extending from said reservoir chamber on one side and having a passage therethrough from said chamber, a cylinder extending from another side of said chamber and having its axis offset laterally from the axis of said nozzle passage, said cylinder diameter being larger than the diameter of said passage and having a portion of the cylinder area aligned with said passage, a piston operating in said cylinder for drawing in material from said reservoir chamber and discharging it through said nozzle passage, means for continuously forcing material into said reservoir chamber, and a shiftable valve in said reservoir chamber between said passage and said cylinder, said valve having a port hole therethrough arranged in one position to connect said reservoir chamber with one side of the cylinder and in another position to connect the nozzle passage with the other side of the cylinder.

3. Dispensing apparatus as set forth in claim 2, in which said nozzle has a head extending upwardly into the reservoir chamber and in which said cylinder is arranged on an opposite wall of said chamber.

4. Dispensing apparatus as set forth in claim 2, in which there are a plurality of dispensing nozzles, cylinders, and said valve has a plurality of port holes, all arranged in the manner specified for the one unit arrangement.

5. Dispensing apparatus as set forth in claim 2, in which said shiftable valve comprises a sliding plate slidably mounted in said one side of said reservoir chamber in engagement with the terminal end of said dispensing nozzle at said one side of said reservoir chamber.

6. Dispensing apparatus as set forth in claim 3, in which there are a plurality of dispensing nozzles, cylinders, and said valve has a plurality of port holes, all arranged in the manner specified for the one unit arrangement.

7. Dispensing apparatus as set forth in claim 6, in which said plurality of dispensing nozzles terminate in a common plane at said one side of said reservoir chamber and in which said shiftable valve comprises a flat plate having one side thereof in engagement with the terminal ends of said plurality of dispensing nozzles at said one side of said reservoir chamber.

8. Dispensing apparatus as set forth in claim 7, in which said cylinders are formed in a cylinder plate having a planar surface spaced from said one side of said reservoir chamber and in which said shiftable valve has the side opposite said one side thereof in contact with said cylinder plate.

9. Dispensing mechanism comprising in combination: a dispensing head comprising a cylinder plate and a bottom plate connected to each other in spaced relation to define therebetween a reservoir chamber, a plurality of nozzles having dispensing passages therethrough and projecting downwardly through said bottom plate away from said chamber, each of said nozzles having an enlarged head portion projecting upwardly into said chamber and having coplanar extended termini, a plurality of metering cylinders in said cylinder plate communicating with said chamber, each of said cylinders having a cross sectional area greater than the cross sectional area of said dispensing passages, at least a portion of each of said cylinders being aligned with a nozzle head, a metering piston in each of said cylinders, and a reciprocatory power device connecting said pistons for permitting movement of said pistons longitudinally of said cylinders whereby movement of said pistons in one direction permits material to move into said cylinders from said chamber, and movement of said pistons in an opposite direction causes said material to be discharged through said dispensing passage, a shuttle valve plate slidably mounted in said chamber and engageable with said extended termini of said nozzle heads and the lower surface of said cylinder plate, a second reciprocatory power device connected to said valve plate to move said plate between a first and a second position, a plurality of port holes in said valve, each hole alignable, when said valve is in said first position, with said chamber and one of said cylinders, and alignable, when said valve is in said second position, with one of said cylinders and its associated dispensing passage, and means for continuously forcing material into said chamber.

References Cited by the Examiner

UNITED STATES PATENTS 2,857,082  10/58  Perkins _____ 222—255

LOUIS J. DEMBO, *Primary Examiner.*

HADD S. LANE, *Examiner.*